United States Patent [19]

Pfrimmer et al.

[11] Patent Number: 4,993,217
[45] Date of Patent: Feb. 19, 1991

[54] MACHINE FOR FORMING CYLINDRICAL BALES OF CROP

[75] Inventors: Ernest Pfrimmer, Roulhing; Raymond Bertrand, Sarreguemines, both of France

[73] Assignee: Deere & Company, Moline, Ill.

[21] Appl. No.: 465,866

[22] Filed: Jan. 16, 1990

[30] Foreign Application Priority Data

Jan. 30, 1989 [GB] United Kingdom ............... 8901956

[51] Int. Cl.⁵ .............................................. A01D 57/26
[52] U.S. Cl. ........................................ 56/341; 100/88
[58] Field of Search .................................... 56/341–347, 56/432, DIG. 21; 100/88

[56] References Cited

U.S. PATENT DOCUMENTS

| 3,815,344 | 6/1974 | Kucera | 56/341 |
| 4,172,354 | 10/1979 | Vermeer et al. | 56/341 |
| 4,510,741 | 4/1985 | Campbell et al. | 56/341 |
| 4,766,717 | 8/1988 | Thomann | 56/341 |
| 4,910,949 | 3/1990 | Meyer | 56/341 |

FOREIGN PATENT DOCUMENTS

| 83/00599 | 3/1983 | PCT Int'l Appl. |
| 1353893 | 5/1974 | United Kingdom |
| 2059869 | 4/1981 | United Kingdom |

Primary Examiner—Thuy M. Bui

[57] ABSTRACT

A baler for forming large cylindrical bales of crop material has a baling chamber in which the crop is rolled into a bale by oppositely moving runs of side-by-side belts. A windrow of crop material is fed through an inlet of the baling chamber by a pick-up which lifts the windrow of crop and delivers the same to a feeder fork mechanism which in turn moves the crop into the inlet. Crop enters the baling chamber between a roll, over which the belts are trained, and a growing bale core. In order to reduce plugging of the crop at the inlet, the roll has discs rigidly mounted on it between neighboring belts. These discs each have an outer edge which is approximately sinusoidal in configuration and the peaks of the undulations extend outwardly beyond the thickness of the belts. The effect of the discs is both to grip the crop better and to raise the bale core slightly to provide easier access to the chamber for the crop.

4 Claims, 4 Drawing Sheets

MACHINE FOR FORMING CYLINDRICAL BALES OF CROP

BACKGROUND OF THE INVENTION

This invention relates to a machine for forming cylindrical bales of crop.

Machines, towed by a tractor, for forming large cylindrical bales of hay (so called "round" balers) are well known. As the machine advances, the crop is removed from a windrow by a pick-up mechanism and delivered rearwardly to the inlet of a baling chamber where it is rolled into a bale between sets of oppositely moving belts, the growing bale rotating about a horizontal axis and the baling chamber expanding with the bale. The belts are trained over rolls which extend laterally of the machine and most of which are journalled at either end in the sides of the machine. One of the rolls is directly driven and the belts and other rolls are thus driven thereby.

The configuration of the rolls and belts is such that crop is fed into the chamber between belts, trained over a roll at the inlet, and the growing bale. Under certain conditions, plugging may tend to occur at the inlet when the bale has become large because the crop fails to be drawn into the chamber quick enough through the nip between these belts and the bale.

SUMMARY OF THE INVENTION

According to the present invention, there is provided a feed mechanism which reduces the tendency of material to plug at the entrance to the bale chamber.

It is an object of the invention to provide a feed mechanism which raises a partially formed bale above a section of the bale-forming belts so as to provide a space adjacent the bale chamber entrance into which crop may be fed. The foregoing object is accomplished by a large round baler having a baling chamber for rolling the crop into a bale, the chamber having an inlet for the crop and a roll at the inlet disposed so that the crop can be fed into the baling chamber between the roll and the bale, the roll having projections thereon arranged so as to assist in advancing the crop into the chamber.

The projections serve both to engage the crop more positively to move it as the roll turns and also to space the growing bale somewhat from the belts trained over to roll so the nip, between the bale and the belts, to which the crop is fed is therefore slightly enlarged to accommodate better the flow of crop presented to it.

Although the invention is intended primarily to be applied to belt type round balers as described above, it can be used in relation to those round balers which are beltless and in which the baling chamber is defined simply by rolls.

DESCRIPTION OF THE PREFERRED EMBODIMENT

Figure 1:
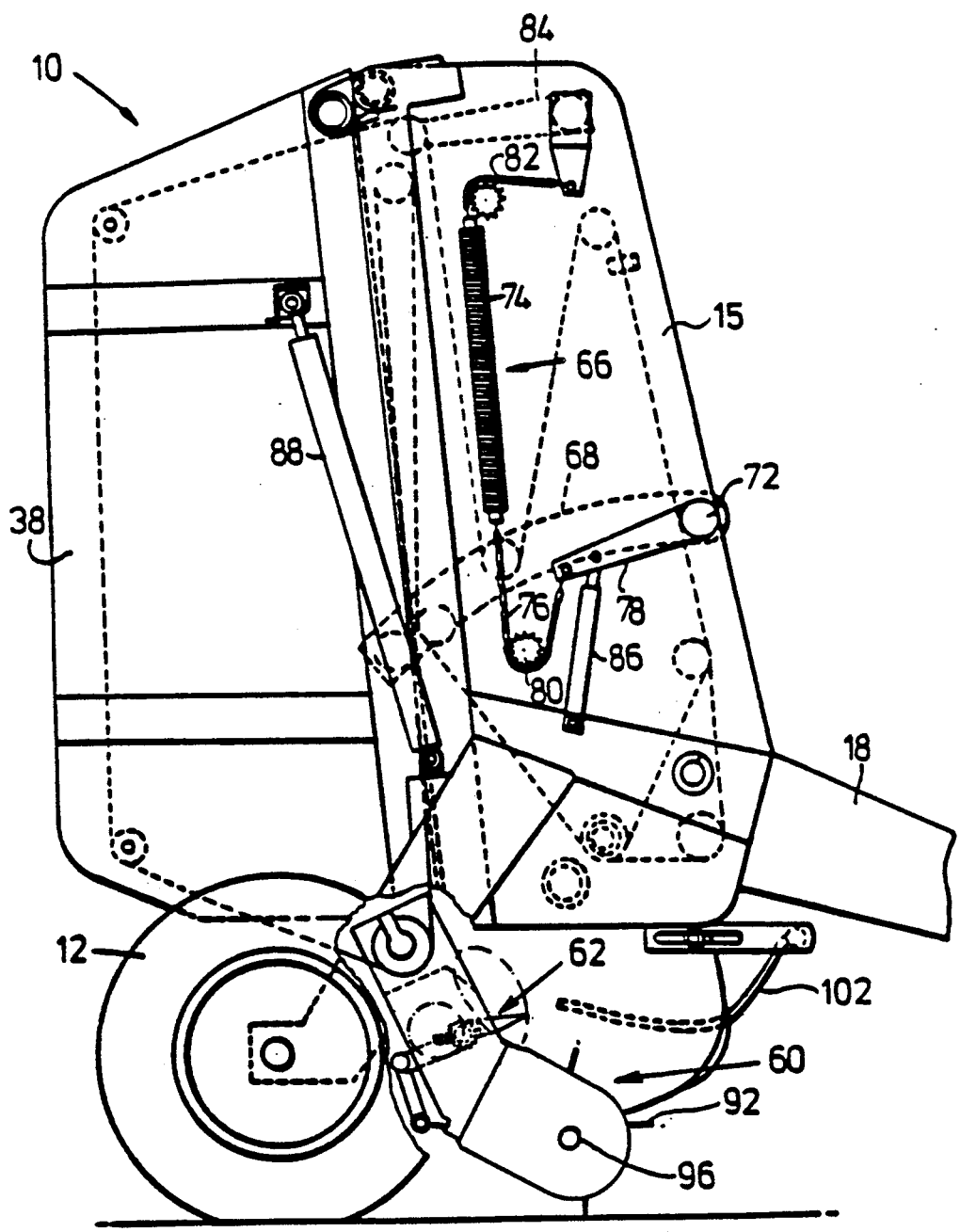
FIG. 1 is an elevational view of the right hand side (considered when facing the direction of advancement) of a baling machine with a chamber for forming large cylindrical bales of crop material, such as hay or straw, showing in broken lines the disposition of transverse rolls and of belts trained round the rolls within the machine.

In the drawings (FIGS. 1 and 2), the machine includes a maim frame 10 mounted on a pair of wheels 12, 14. The main frame 10 has a pair of upright, opposite, fore-and-aft extending right and left side walls 15, 16 connected by transverse beams (not shown), with a draft tongue 18 being rigid with one of the beams at the from of the frame 10 and extending forwardly for attaching the baler to a tractor (not shown) which draws the machine.

Figure 2:
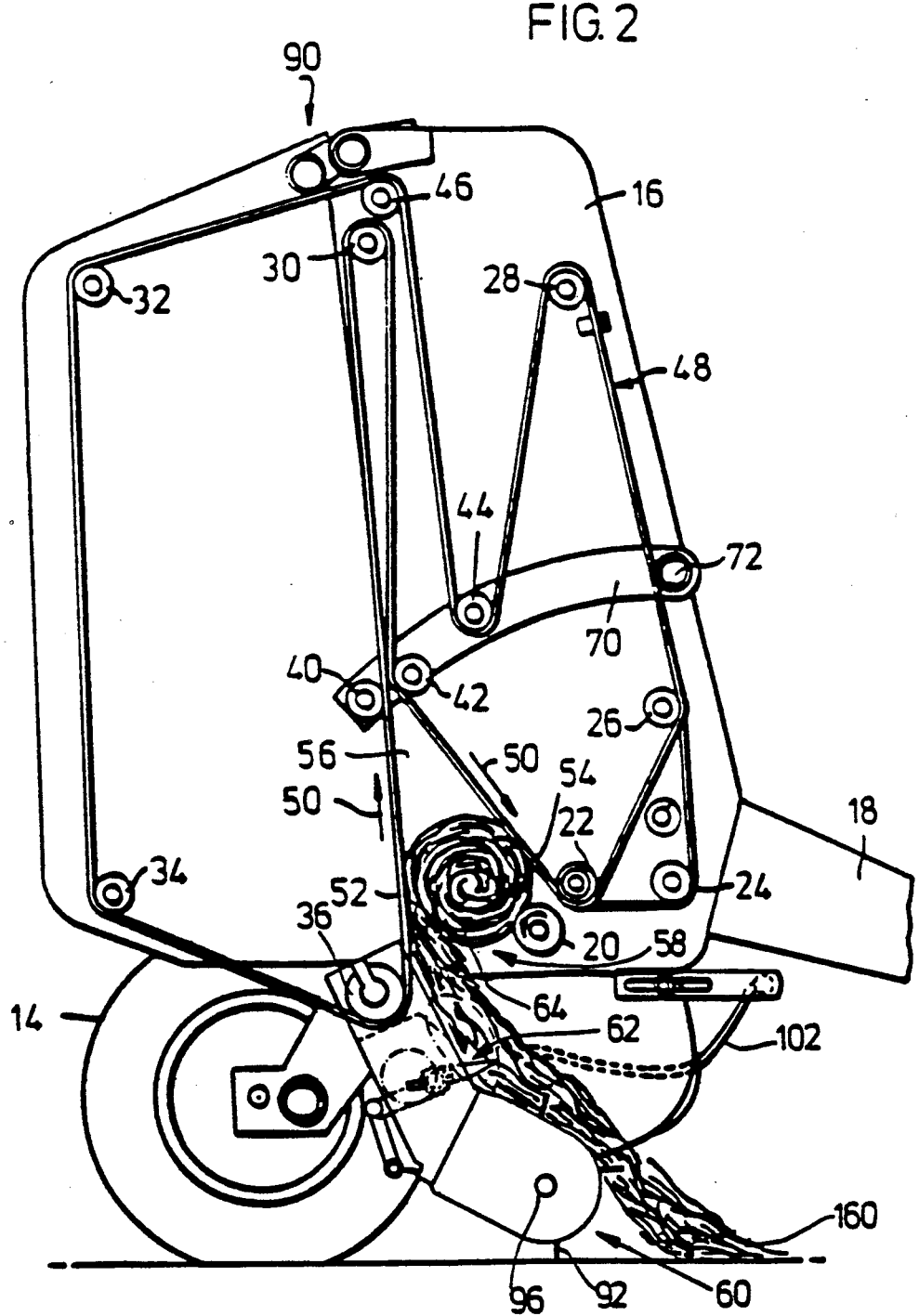
FIG. 2 is an elevational view similar to FIG. 1, but with the right hand side of the machine removed.

A plurality of driven lateral rolls, shown in broken lines in FIG. 1 and in full lines in FIG. 2, extends over the width of the machine. One set of rolls 20, 22, 24, 26, 28, 30 is journalled in a forward fixed portion of either side wall, whilst a further set constituted by rolls 32, 34, 36 is journalled in a rearward swingable gate portion 38 of the side walls. There is also a pair of chamber restricting rolls 40, 42 and take-up and tensioning rolls 44, 46.

Six rubber belts 48 are trained side-by-side over the rolls, with the exception of the roll 20 which acts as a stripper roll, to provide the configuration shown in FIGS. 1 and 2 and they move in the direction indicated by arrows 50, the stripper roll 20 being driven anti-clockwise as viewed in the two figures. However, as shown in FIG. 2, alternate belts only are trained over the lower foremost roll 24, whilst the remaining belts by-pass the roll 24 and run directly between the roll 22, which is at the same horizontal level as the roll 245, and the roll 26 above. This creates, as explained and claimed in our European patent application No. 82106409, a staggered array of belts affording the release of stray crop through gaps, formed as a result of the staggering, between neighboring belts. Upwardly extending runs 52, 54 of the belts 48 provide with the side walls a bale-forming chamber 56 which has an inlet 58 for crop received from a pick-up 60 and feeder fork mechanism 62 beneath the inlet.

In order to accommodate the increasing diameter of a growing bale core 64 in the bale-forming chamber 56, the size of the chamber must also increase and a belt take-up and tensioning mechanism 66 is provided for this purpose at either side of the machine. These mechanisms include: a pair of arms 68, 70 which are mounted on a horizontal transverse pivot shaft 72 at the forward end of the main frame 10; the take-up and tensioning roll 44 which is supported at either end at an intermediate location on the arms 68, 70; and the pair of chamber restricting rolls 40, 42 supported at the free end of the arms. The arms 68, 70 are biased in an anti-clockwise direction by a pair of springs one on either side of the main frame 10 of which just the right hand spring 74 is shown and only its arrangement will be described, the other being similar. The spring 74 acts through a chain 76, at its lower end, on a bias arm 78 connected rigidly to the pivot shaft 72, the chain 76 being trained over a sprocket 80. At its upper end a further chain 82 similarly connects the spring 74 to one end of a bell crank 84, and the other end of the bell crank bears one end of the take-up and tensioning roll 46. The bias arm 78 is also restrained by a piston and cylinder unit 86 pivotally connected at one end to the free end of the bias arm 78 and at the other to the associated right hand side wall 15 of the main frame 10. A similar arrangement is provided on the left hand side of the machine so that, for example, the roll 46 is carried by bell cranks on either side. The rear gate portion 38 is movable by a pair of upwardly extending hydraulic piston and cylinder units on either side of the main frame 10 of which only a right hand unit 88 is shown which is pivotally connected at its lower end to the forward fixed portion of the side wall 16 and at its upper end to the gate portion 38 which is swingable upwardly and downwardly about a pivot arrangement 90 at its upper forward region.

Figure 3:
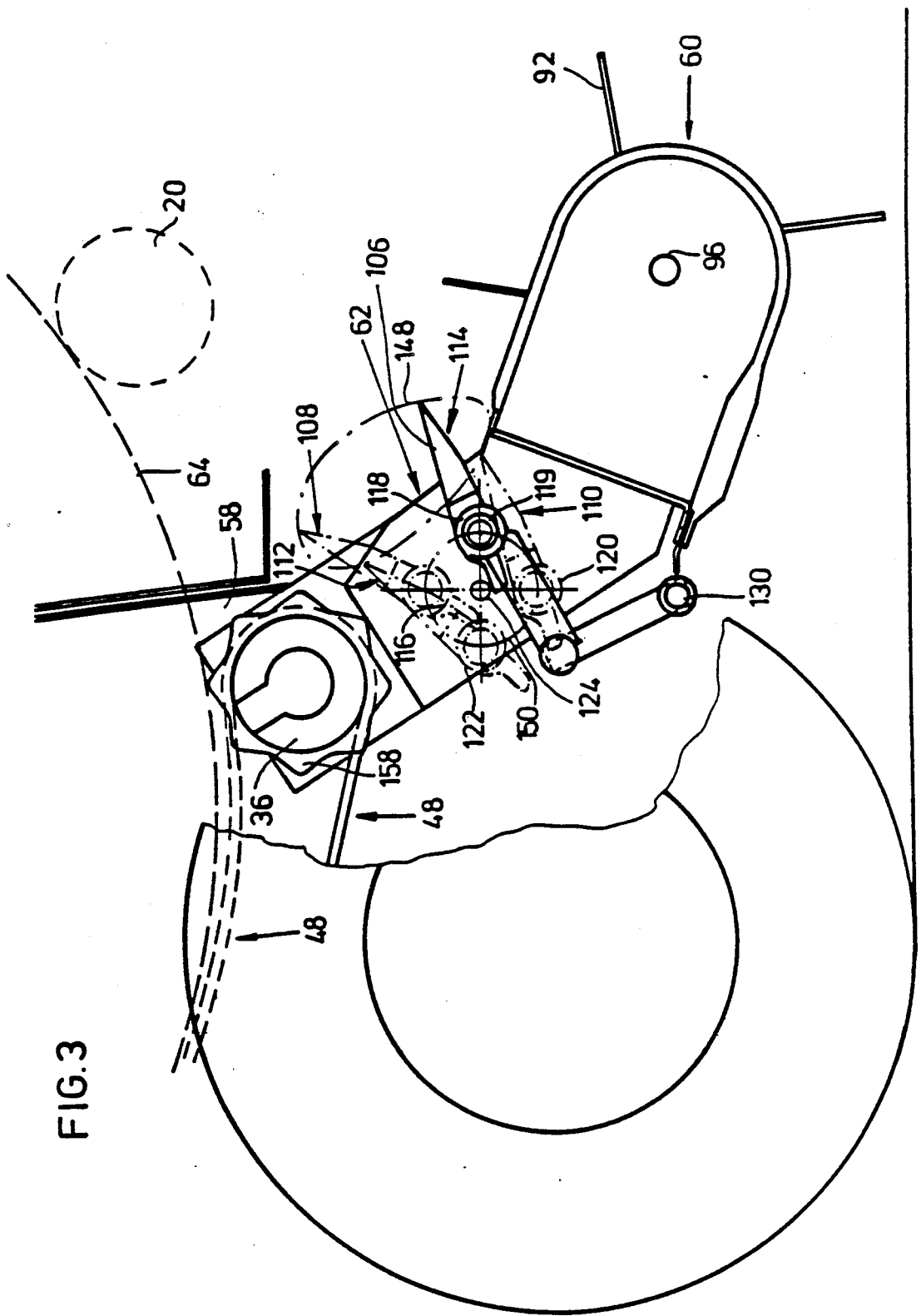
FIG. 3 is a detail view from the right of the inlet to the baling chamber of FIGS. 1 and 2.
Figure 4:
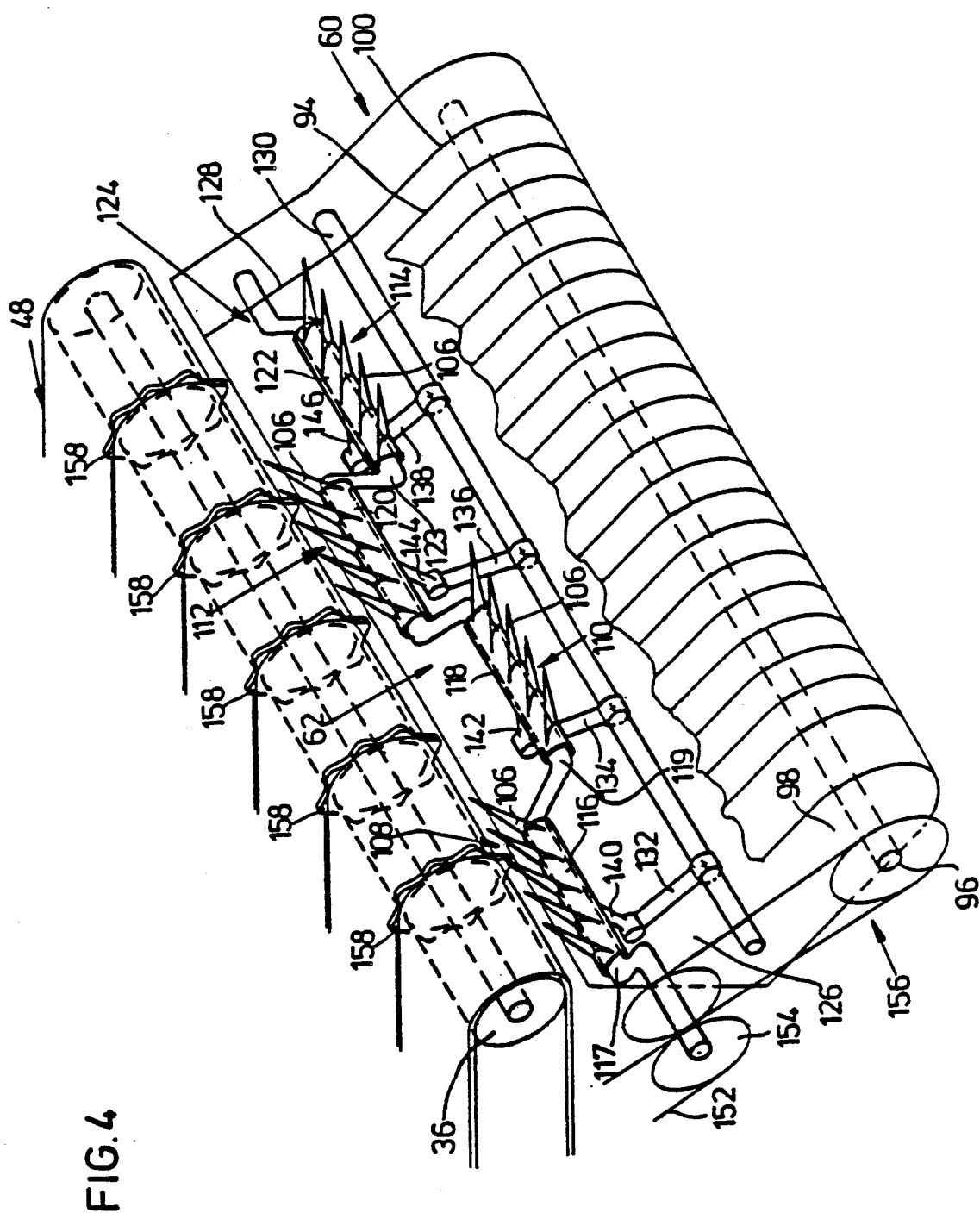
FIG. 4 is a perspective view looking from the front right of the inlet to the baling chamber.

The pick-up 60 extends rearwardly and upwardly at a small angle and is conventional in that it has rotating teeth 92 (shown in FIG. 3, but omitted from FIG. 4 which is highly diagrammatic) which extend between neighboring strippers 94 and which are mounted on a driven shaft 96 journalled in right and left pick-up plates 98, 100 with crop compressors 102 overhead.

The feeder fork mechanism 62 is disposed at the rearward downstream end of the pick-up 60, is angled upwardly more steeply, and terminates at the roll 36 at the inlet 58 of the baling chamber 56. This mechanism 62 has strippers which are aligned with the pick-up strippers 94. Crop advancing tines 106 are arranged to extend between the strippers. The tines 106 are rigidly attached in four groups of five 108, 110, 112, 114, to four tubes 116, 118, 120, 122 and are connected to the respective tubes via arms 140, 142, 144, 146 which at one end are pivotally connected via bushings to the arms 132, 134, 136, 138 and at the other are rigidly attached to the tubes 116, 118, 120, 122. In this way, when the crankshaft 124 is turned, the outer ends of the tines 106 trace out a geometric path 148. For clarity, in FIG. 3 only one tine group 114 is shown in full line whilst the remaining groups 108, 110, 112 are indicated just in broken lines. When viewed in FIG. 3, the crank tubes 116, 118, 120, 122 are disposed on a geometric circle 150 at angular intervals one to the next of 90°.

A chain 152 from the main drive (not shown) of the machine transmits drive to the crankshaft 124, via a sprocket 154, and in turn drive is transmitted thence, also by a chain and sprocket arrangement 156, to the pick-up shaft 96.

The roll 36 at the inlet 58 is adapted to assist in advancing crop into the chamber 56. Discs 158 are rigidly mounted on the roll 36 between neighboring belts 48 and are coaxial with the roll. The outer edge of each disc 158 is approximately sinusoidal in configuration, the peaks of the undulations extending outwardly beyond the thickness of the belts 48.

In operation, crop lying in a windrow 160 is lifted and conveyed to the inlet 58 of the baling chamber 56 by the pickup 60 and feeder fork mechanism 62. Within the chamber 56 the oppositely moving runs 52, 54 of the belts 48, aided by the stripper roll 20, cause the crop to turn clockwise (as viewed in FIGS. 1 and 2) to form the bale core 64 which is of increasing size.

The discs 158 have a twofold purpose. Firstly, they serve to afford better grip to the crop to advance it more readily into the baling chamber 56 and, secondly, they raise the bale core 64 (once it has achieved a certain size) slightly off the belts 48 trained over the roll 36 so the nip through which the crop must move between the belts 48 and bale core 64 at the inlet 58 is enlarged somewhat in order to ease the passage of crop into the baling chamber 56. In this way the risk of crop plugging at the inlet 58 is reduced.

The growing bale core 64 overcomes the tension in the belts 48 brought about by the tensioning mechanisms, and the arms 68, 70 consequently swing upwardly and thus the chamber 56 increases in size to accommodate the core. When the bale core 64 reaches the size of the required bale, crop flow to the inlet 58 is stopped and the bale is tied with twine and finally discharged by swinging the gate 38 upwardly.

We claim:

1. In a baler for forming large cylindrical bales of crop having a baling chamber defined by a plurality of belts trained side-by-side over a plurality rolls and being operative for rolling the crop into a bale with an inlet for the crop and one of said plurality of rolls being at an inlet to the chamber so that crop can be fed to the baling chamber between the one of said plurality of rolls and the bale, the improvement comprising: said one of said plurality of rolls having discs mounted thereon between adjacent belts and having radial protrusions projecting beyond the thickness of the belts so as to assist in advancing the crop into the chamber.

2. The baler as defined in claim 1 wherein the discs are rigid with said roll.

3. The baler as defined in claim 2 wherein the discs are coaxial with the roll.

4. The baler according to claim 1 wherein said projections are substantially sinusoidal.

* * * * *